United States Patent [19]
Koch

[11] Patent Number: 6,014,326
[45] Date of Patent: Jan. 11, 2000

[54] HALF-BRIDGE BALANCING CIRCUIT

[75] Inventor: James K. Koch, Rocklin, Calif.

[73] Assignee: Hewlett-Packard Company, Palo Alto, Calif.

[21] Appl. No.: 09/181,050

[22] Filed: Oct. 27, 1998

[51] Int. Cl.[7] .............................................. H02M 7/5387
[52] U.S. Cl. .............................................. 363/132; 363/17
[58] Field of Search .................... 363/16, 17, 40, 363/56, 98, 131, 132

[56] References Cited

U.S. PATENT DOCUMENTS

| | | | |
|---|---|---|---|
| 4,800,476 | 1/1989 | Harada et al. | 363/16 |
| 4,800,477 | 1/1989 | Esposito | 363/17 |
| 4,811,185 | 3/1989 | Cook et al. | 363/17 |
| 4,811,187 | 3/1989 | Nakajima et al. | 363/25 |
| 4,926,302 | 5/1990 | Harada et al. | 363/16 |
| 5,019,770 | 5/1991 | Harada et al. | 323/282 |
| 5,481,449 | 1/1996 | Kheraluwala et al. | 363/17 |
| 5,521,467 | 5/1996 | Statnic et al. | 315/247 |
| 5,550,436 | 8/1996 | Houk | 315/209 R |

*Primary Examiner*—Adolf Deneke Berhane
*Attorney, Agent, or Firm*—Denise A. Lee

[57] ABSTRACT

The present invention provides a voltage transformer circuit which combines half-bridge topology with a current-mode control according to the present invention. The DC—DC converter circuit according to the present invention includes: a power transformer, where the primary side of the transformer includes a power winding and a balance winding and a means for injecting a correction current proportional to the amount of current flowing in the balance winding, where the means for injecting a correction current proportionate to the amount of current flowing in the balance winding including a means for sensing the amount of current in the balance winding. The correction current is injected in such a way so that current from the means for injecting a correction current is subtracted from the switch current lengthening the on-time of the switches in the half-bridge circuit thereby driving the bridge center tap back towards $V_{in}/2$, preventing an unstable or runaway operating condition.

11 Claims, 4 Drawing Sheets

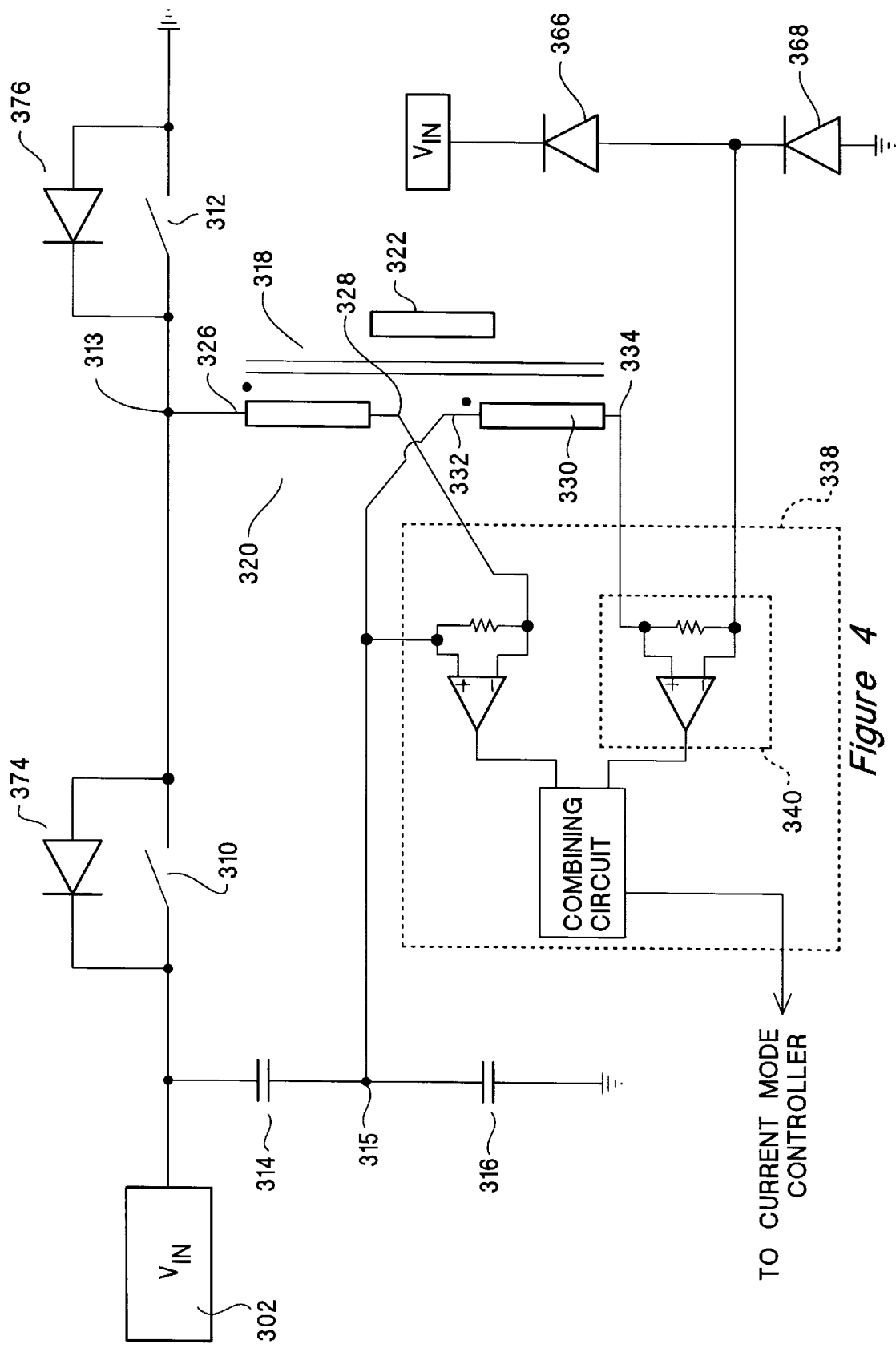

HALF-BRIDGE BALANCING CIRCUIT

BACKGROUND OF THE INVENTION

The present invention relates generally to DC—DC power converter and more specifically to invention is directed towards DC—DC converters having a half-bridge circuit topology in combination with current-mode control.

FIG. 1 shows a partial schematic diagram of a conventional DC—DC power converter 100 in a half-bridge topology. The DC—DC converter 100 includes first and second switches 110, 112, first and second capacitors 114, 116, a primary winding 120 and a secondary winding 122, and a pair of diodes 124, 126. In theory, the half bridge topology operates to maintain a voltage $V_{in}/2$ at its center tap (node 128) and an output voltage $V_{out}$ dependent on the ratio of turns. Referring to FIG. 1, assume that the capacitance of capacitor 114 is equal to the capacitance of capacitor 116 and that switches 110 and 112 alternate being closed an equal amount of time. This results in the voltage at the center tap (node 128) being maintained at $V_{in}/2$. Assuming the primary winding of the transformer has 100 turns and a secondary winding has five turns for the embodiment shown in FIG. 1, for an input voltage $V_{in}$=200 volts, the center tap voltage would be 100 volts and output voltage $V_{out}$ at node 134 would be approximately 5 volts peak.

The half bridge topology shown in FIG. 1 is desirable as it subjects the transistors (in the example shown in FIG. 1, switches 110 and 112) in their off state to a voltage equal to the DC input voltage and not to twice that as do other topologies such as the push-pull, single-ended, and forward converter technologies. Thus, using a half-bridge topology allows the use of transistors with a lower voltage rating. An additional advantage compared to the push-pull converter topology, is that the half-bridge is immune to flux imbalance problems which plague the simplest push-pull topologies. Further, the half-bridge topology allows the use of a push-pull primary drive (which minimizes the transformer size) without requiring power-wasting snubbers. A further advantage of the half-bridge topology is it does not require a center-tapped power winding and requires only two primary switches.

Operating parameters within power converter circuits may be monitored to provide feedback that stabilizes and controls the converter circuitry. In current mode topologies, both voltage and current are typically monitored. In contrast in voltage mode topologies, the output voltage alone is monitored and controlled.

Current-mode control has several advantages compared to voltage-mode control topologies. First, current-mode control is typically is easier to stabilize than voltage mode control. In addition, current mode control gives cycle-by-cycle current limiting which protects components from certain failure modes. Further, current-mode control topologies facilitate current sharing by multiple DC—DC converters. Unfortunately, although current-mode control topologies have advantages, there have been problems combining current mode control with half-bridge circuit topologies.

The difficulty in combining current-mode control with the half-bridge circuit topolgy is that if the bridge center tap (node 118) is not held at exactly one half the input voltage, a "runaway" condition can occur. This runaway condition is typically caused when the center tap voltage is unstable, a condition typically caused by different amount of charge being removed from the capacitors 114, 116. Different amount of charge are typically removed based on uneven storage times in the switching transistors 110 and 112. If the switching transistors 110 and 112 have uneven on times, then the cycle-by-cycle current control will act to drive the center tap even farther away from one half the input voltage.

FIG. 2 shows a partial schematic diagram of a half-bridge topology modified to include a balance winding to compensate for current drift. Such a configuration is shown on pages 10-129 through 10-130 of the Unitrode Application notes. The modified half-bridge topology 200 includes first and second switches 210, 212, first and second capacitors 214, 216, a power transformer 220 which has a primary side that includes two windings a power winding 232 and a balance winding 234, and a pair of balance diodes 224, 226. In the embodiment shown in FIG. 2, the power transformer includes a power winding 232 and a balance winding 234, where the power winding 232 and the balance winding 234 both have an equal number of turns. Further, both a first terminal of the power transformer winding and a first terminal of the balance winding are connected to the center tap node 235. In addition, the second terminal of the balance winding is connected through the balance diodes 224, 226 to each supply rail. In this configuration, the center tap node is forced to $\frac{1}{2}V_{in}$ by nature of the identical number of turns on the power and balance windings. Should the center tap voltage begin to drift away from $\frac{1}{2}V_{in}$, current will flow through the balance winding to compensate by allowing the balance diodes 224 or 226 to conduct to charge either capacitor 214, 216 so as to bring the center tap voltage towards $\frac{1}{2}V_{in}$.

Although in theory, the half-bridge configuration shown in FIG. 2 compensates for current drift, in practice Applicant has found that it will not prevent a runaway condition in some applications useful to Applicant. Applicant believes the resulting nonoperational state is at least in part due to having a low input voltage (typically, a voltage less than 50 volts). The lower the input voltage, the lower the sensitivity of the balance circuit because of the fixed forward voltage drop of the balance diodes.

A DC—DC converter which combines half-bridge topology with a current-mode control that provides a stable center tap voltage under a variety of operating conditions is needed.

SUMMARY OF THE INVENTION

The present invention provides a DC—DC converter circuit that combines half-bridge topology with a current-mode control that provides a stable center tap voltage under a variety of operating conditions. The present invention is designed to work with a half-bridge topology that includes a power transformer where the primary side of the power transformer includes a power winding and a balance winding, where the number of turns on the power winding is equal to the number of turns on the balance winding, and a balance diode pair. Current mode control is preferably provided by a current sense transformer that provides a means for injecting a correction current proportional to the amount of current flowing in the balance winding. The means for injecting a correction current proportional to the amount of current flowing in the balance winding including a means for sensing the amount of current in the balance winding.

Typically, the means for sensing current in the balance winding of the power transformer is an auxiliary winding on the primary side of the current sense transformer. The purpose of the auxiliary winding in the current sense transformer is to reflect the balance diode current into the output of the current sense transformer in such a way as to lengthen the on-time of one the switches in the half-bridge circuit, thus driving the bridge center tap back towards $V_{in}/2$. The leads of the auxiliary winding of the current sense transformer are connected to the balance winding of the power transformer so that a current proportional to the balance winding current is subtracted from the switch current. Thus, the net effect of the current in the balance diodes is to reduce the current sensed by the current sense transformer.

The operation of the circuit is as follows: if the half-bridge circuit is not balanced, then one of the balance diodes conducts. The balance diode current flows in the auxiliary winding on the current-sense transformer. The direction of this current is such that the output of the current-sense transformer reflects a lower current than it would have otherwise. The controller sees this lower current, and leaves the associated power switch on longer, until the apparent switch current finally does reach the value requested by the voltage control loop. Leaving this power switch on longer acts to bring the bridge center tap back towards $V_{in}/2$, helping to prevent an unstable operating condition found in other half-bridge topologies having current-mode control.

The correction current of the current sense transformer is proportional to and is a function of the current flowing in the balance winding of the power transformer. To amplify the effect of the correction current that is generated by the current sense transformer, the number of turns in the auxiliary winding of the current sense transformer is typically a multiple of the number of turns in the current winding of the current transformer.

A further understanding of the nature and advantages of the present invention may be realized with reference to the remaining portions of the specification and the attached drawings.

BRIEF DESCRIPTION OF THE DRAWINGS

FIG. 4 shows a partial schematic diagram of a half-bridge topology according to an alternative embodiment of the present invention.

DETAILED DESCRIPTION OF THE PREFERRED EMBODIMENT

Figure 1:
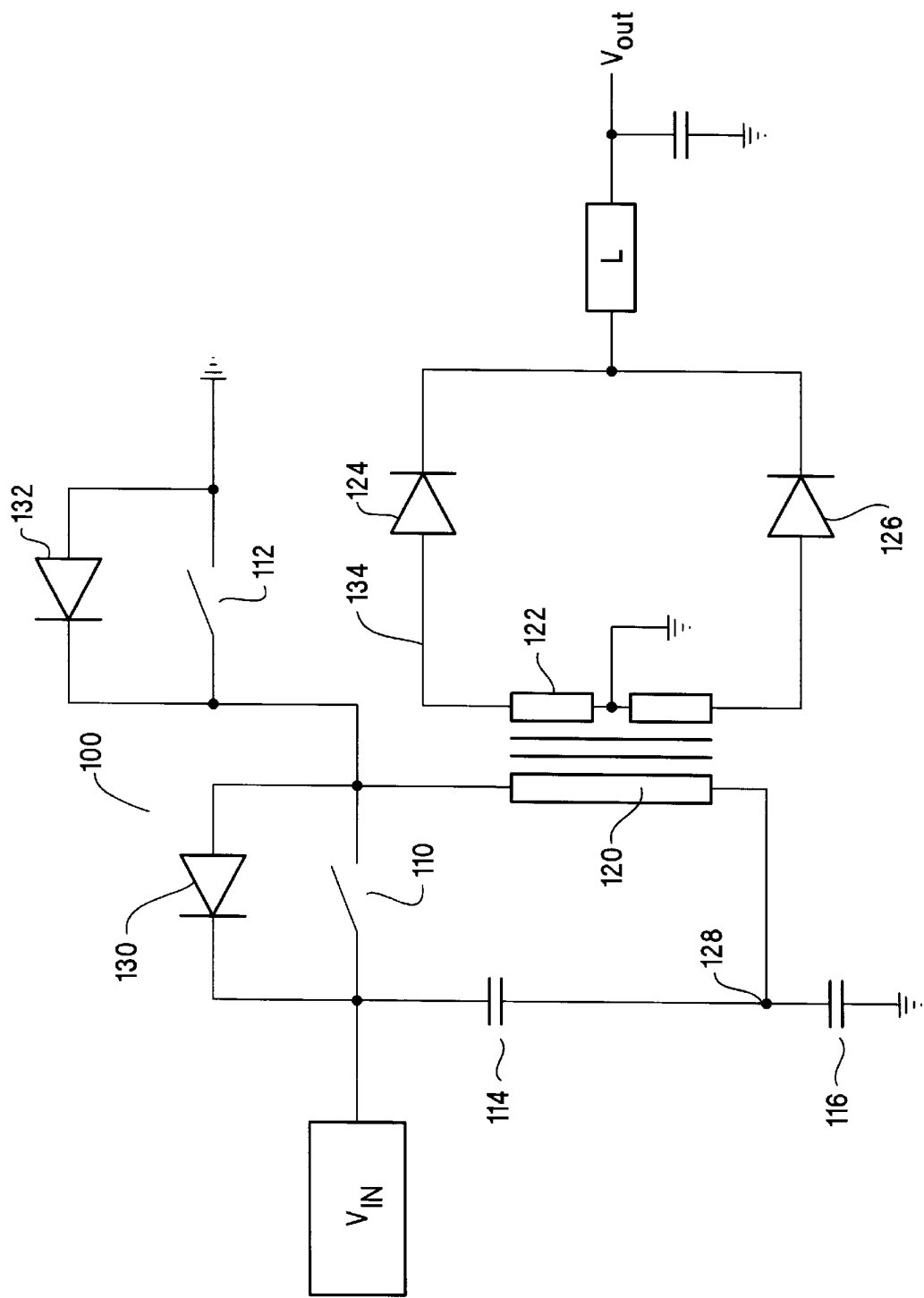
FIG. 1 shows a partial schematic diagram of a half-bridge topology for a DC—DC converter circuit.
Figure 2:
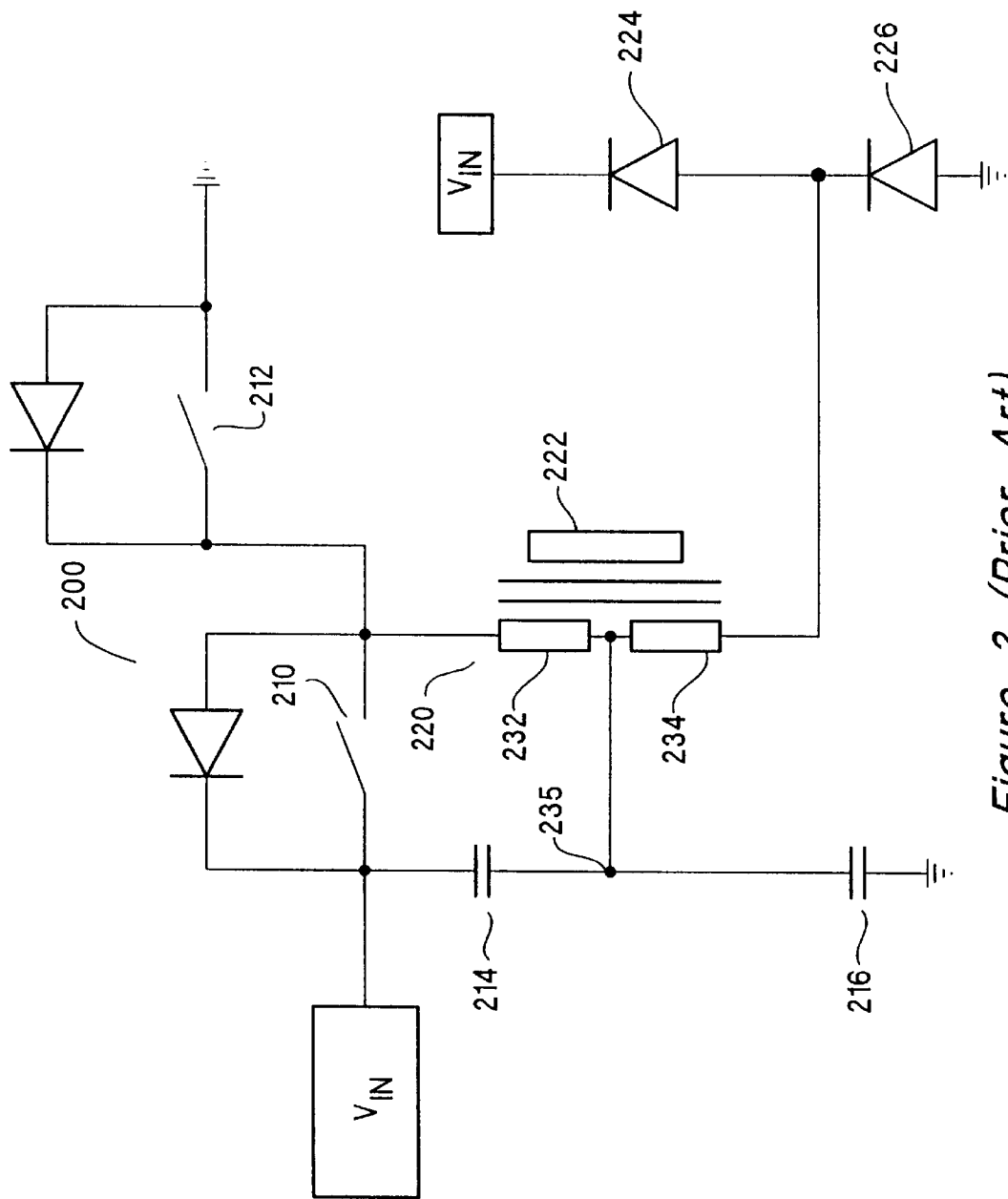
FIG. 2 shows a partial schematic diagram of a half-bridge topology modified to include a balance winding to compensate for current drift.
Figure 3:
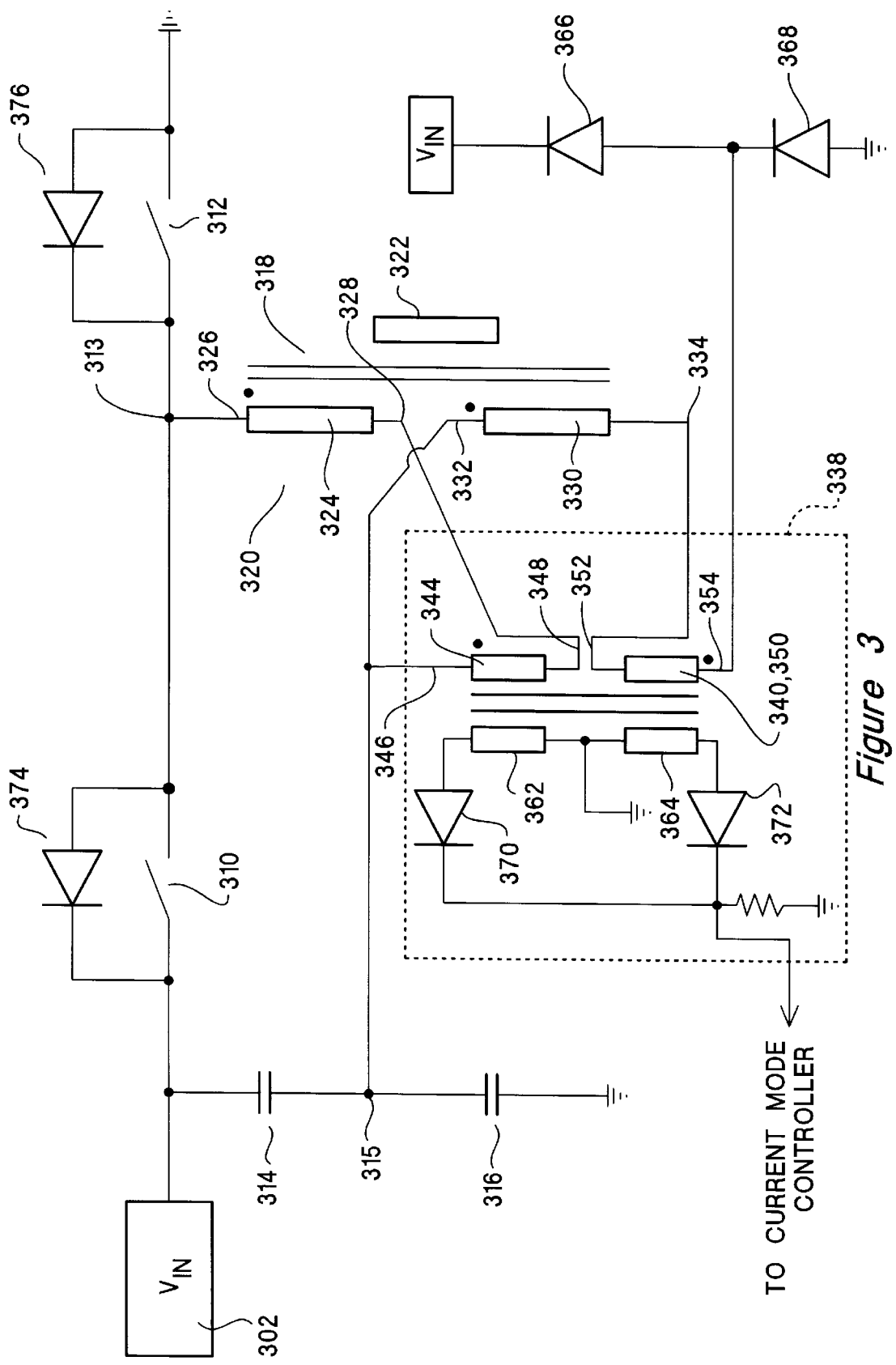
FIG. 3 shows a partial schematic diagram of a half-bridge topology according to the present invention.

FIG. 3 shows a partial schematic diagram of a DC—DC converter circuit 300 which combines half-bridge topology with a current-mode control according to the present invention. The DC—DC converter circuit 300 includes: a first input voltage means 302 for providing a first input voltage; a first switching means 310, the first switching means 310 electrically coupled to the first input voltage means 302; a second switching means 312, the second switching means 312 electrically coupled to both ground and the first switching means 310; a first storage means 314, the first storage means 314 being electrically coupled to a center tap node 315 and the first input voltage means 302; a second storage means 316, the second storage 316 means electrically coupled to ground; a power transformer means 318, comprised of a power winding 324 and a balance winding 330 on the primary side and a secondary winding 322, the balance winding 330 having a first terminal 332 and a second terminal 334, wherein the number of turns on the power winding 324 is equal to the number of turns on the balance winding 330, wherein the second switching means 312 is electrically coupled to a first terminal 326 of the power winding 324 of the power transformer means 318; and a means for injecting a correction current 338 proportional to the amount of current flowing in the balance winding 330 of the power transformer means 318, the means for injecting a correction current 338 proportional to the amount of current flowing in the balance winding 330 including a means for sensing 340 the amount of current in the balance winding 330, the means for sensing 340 the amount of current in the balance winding 330 being electrically coupled to the second terminal 334 of the balance winding.

The present invention is designed to work with a half-bridge topology that includes a power transformer that has a primary power winding and a balance winding. Referring to FIG. 3 shows a half bridge topology that includes: a first input voltage means 302 for providing a first input voltage; a first switching means 310, the first switching means 310 electrically coupled to the first input voltage means 302; a second switching means 312, the second switching means 312 electrically coupled to both a first voltage and the first switching means 310. In the preferred embodiment, the first input voltage means is a power supply that provides a voltage $V_{in}$ and the first switching means and the second switching means are identical transistor devices, preferably MOSFETS such as type IRF640. The second switch is electrically coupled to the first switching means at node 313 and a first voltage, typically ground. In a second alternative embodiment, the single MOSFET switch 310, 312 is replaced with two MOSFETs connected in parallel.

Referring to FIG. 3, the half-bridge topology present invention further includes a first storage means 314, the first storage means 314 being electrically coupled to a center tap node 315 and the first input voltage means 302; a second storage means 316, the second storage means 316 electrically coupled to both the center tap node and a second voltage; and a power transformer means 318 that includes a primary 320 and secondary winding 322. In the preferred embodiment, the first storage means 314 and the second storage means 316 are capacitors that are equal in value and the second storage means is electrically coupled to a second voltage, typically ground. In addition, the center tap node 315 is connected to the power transformer 318.

In theory, the half-bridge topology described above will provide a stable voltage of $V_{in}/2$ at the center-tap node 315, in reality the described configuration will often result in a nonstable or runaway operating condition. Assuming no means for injecting a correction current, and that the times that the switches 310 and 312 are closed are unbalanced, such that t2 (the time that switch 312 is closed) is greater than t1 (the time that switch 310 is closed) and a $V_{in}$ such that switch 312 being closed drives node 313 to ground. If switch 312 is closed for a time period t2, this results in the bridge center tap voltage at node 315 going below $V_{in}/2$ since node 313 spends more time connected to ground than it does connected to $V_{in}$. The center tap voltage at node 315 being below $V_{in}/2$, shortens the next period t1 period since the voltage across the primary during t1 is increased by the voltage at the center tap being lowered. The higher voltage across the primary winding during period t1 means that the current will ramp up at a higher rate due to a higher voltage across the secondary winding 322. The primary current will reach the current control peak value sooner than it would have thus shortening the time period t1 required to drive the center tap resulting in an even lower voltage at the center tap node 315, resulting in time period t2 being lengthened even further, and so on. This "positive feedback" would quickly drive the converter circuit to a nonoperational state.

Typically, the power transformer means 318 is a power transformer that includes a primary winding 320 and secondary winding 322. However, unlike traditional power transformers in half-bridge circuits, in the present invention the primary winding of the power transformer includes a balance winding 330. The balance winding 330 and means for injecting a correction current 338 help provide a stable voltage $V_{in}$ at the center-tap node 315.

Referring to FIG. 3, the primary winding 320 of the power transformer includes a power winding 324 having a first terminal 326 and a second terminal 328 and a balance winding 330 having a first terminal 332 and a second terminal 334. In order to balance the half-bridge circuit, preferably the number of turns on the power winding 324 should be equal to the number of turns on the balance winding 330. Further, the second switch 312 is electrically coupled to a first terminal 326 of the power winding 324 of the power transformer means 318 and both the second terminal 334 of the power winding and the first terminal 332 of the balance winding are electrically coupled to the center-tap node 315.

In addition to the balance winding, in the preferred embodiment includes a pair of balance diodes 366, 368 electrically coupled to the second terminal 354 of the auxiliary winding of the current sense transformer. Although in the preferred embodiment, diodes are used to direct current flow, alternatively, other unidirectional current flow devices may be used. For example, a synchronously switched semiconductor transistor could be used in place of a diode. Both the first balance unidirectional current flow means (the first balance diode) 366 and the second balance unidirectional current flow means (the second balance diode) 368 are electrically coupled to the second terminal 354 of the auxiliary winding 340. Responsive to voltage drift of the center-tap node away from ½$V_{in}$, current will flow through the balance winding 330 to compensate by allowing the balance diodes 366 or 368 to conduct to charge either capacitor 314 or 316 so as to bring the center tap voltage back to ½$V_{in}$.

In the present invention the means for injecting a correction current 338 proportional to the amount of current flowing in the balance winding is performed in part by a current sense transformer 339. The primary side of the current sense transformer 339 includes a current winding 344 having a first terminal 346 and a second terminal 348 and an auxiliary winding 350 having a first terminal 352 and a second terminal 354, wherein the first terminal 352 of the auxiliary winding 350 of the current sense transformer is electrically coupled to the second terminal 334 of the balance winding of the power transformer 318.

Referring to FIG. 3, in the preferred embodiment the secondary winding 360 of the current sense transformer 339 is a center tapped winding that includes a first feedback winding 362 and a second feedback winding 364. The center tap node 366 of the secondary winding is preferably connected to ground. In the preferred embodiment, the number of turns in the first feedback winding 362 is equal to the number of turns in the second feedback winding 364.

The means for injecting a correction current further includes a pair of correction diodes 370, 372. Although in the preferred embodiment, diodes are used, alternatively, other unidirectional current flow devices may be used. Both the first correction unidirectional current flow means (the first correction diode) 366 and the second correction unidirectional current flow means (the second correction diode) 368 are connected in series and are both electrically coupled to the terminals of the secondary winding of the current sense transformer 339.

The correction current that flows in the current sense transformer 339 is proportionate to and is a function of the current flowing in the balance winding 330 of the power transformer. In the preferred embodiment of the present invention, the number of turns on the power winding of the current sense transformer is different than the number of turns on the auxiliary winding of the current sense transformer. The strength of the correction current is proportional to the number of turns in the auxiliary winding. Typically, the number of turns in the auxiliary winding of the current sense transformer is typically a multiple of the number of turns in the power winding of the current transformer. Through experimentation, Applicant has found for the current sense transformer a multiple of three times the number of turns in the balance winding compared to the number of turns in the power winding has been found to provide good performance characteristics.

In the preferred embodiment of the present invention, the first terminal of the power winding of the current sense transformer is electrically coupled to both the center tap node and the first terminal of the balance winding of the power transformer means. Further, the second terminal of the auxiliary winding of the current sense transformer 339 is electrically coupled to the second terminal of the power winding of the power transformer means.

The operation of the circuit is as follows: if the half-bridge circuit is not balanced, then one of the balance diodes 366, 368 conducts. The balance diode current flows into the auxiliary winding 350 of the current sense transformer 339. The direction of this current is such that the output of the current sense transformer 339 reflects a lower current than it would have otherwise. The switch (310 or 312) sees this lower current, and leaves the associated power switch on longer, until the reflected or correction current finally does reach the value requested by the voltage control loop. Leaving this power switch on longer acts to bring the bridge center tap voltage at node 315 back towards $V_{in}/2$, helping to prevent an unstable operating condition found in other half-bridge topologies having current-mode control.

In an alternative embodiment, a means for injecting a correction current can be performed using alternatives to the configuration shown in FIG. 3. For example, the means for sensing the amount of current in the balance winding can be performed by a resistor or a Patent Application Hall effect device instead of a winding of a transformer. The alternative sensing device could be coupled to an output amplifying device which in turn could be electrically coupled to the current mode control circuit through a combining circuit, thus effecting the on and off times of the switches 310 or 312.

FIG. 4 shows a partial schematic diagram of a half-bridge topology according to an alternative embodiment of the present invention In the embodiment shown in FIG. 4, the means 338 for injecting a correction current proportional to the current flowing in the balance winding of the power transformer includes resistors 380, 382, amplifying circuit means 384, 386 and a combining circuit 388. In the preferred embodiment, the sensed current through resistors 380,382 is typically amplified according to the desired characteristics to be output to the current controller. Thus, the amount of amplification in the amplifying means 384 and 386 may be different. The result of the amplification is combined in the combining circuit 388 and the results of the combining circuit are output to the current mode controller (not shown).

It is understood that the above description is intended to be illustrative and not restrictive. The scope of the invention should therefore not be limited with reference to the above description, but instead should be determined with reference to the appended claims along with the full scope of equivalents to which such claims are entitled.

What is claimed is:

1. A half-bridge voltage transformer circuit, comprising:
    a first input voltage means for providing a first input voltage;
    a first switching means, the first switching means electrically coupled to the first input voltage means;
    a second switching means, the second switching means electrically coupled to a first voltage, the second switching means electrically coupled to the first switching means;
    a first storage means, the first storage means being electrically coupled to a center tap node and the first input voltage means;
    a second storage means, the second storage means electrically coupled to the first storage means and a second voltage;
    a power transformer means, wherein the primary side of the power transformer means includes a power winding having a first terminal and a second terminal and a balance winding having a first terminal and a second terminal, wherein the number of turns on the power winding is equal to the number of turns on the balance winding, wherein the second switching means is electrically coupled to a first terminal of the power winding of the power transformer means; and
    a means for injecting a correction current proportional to the amount of current flowing in the balance winding, the means for injecting a correction current proportional to the amount of current flowing in the balance winding including a means for sensing the amount of current in the balance winding, the means for sensing the amount of current in the balance winding being electrically coupled to the second terminal of the balance winding.

2. The half-bridge voltage transformer circuit recited in claim 1 wherein the means for injecting a correction current proportionate to the amount of current flowing in the balance winding includes a current sense transformer, wherein the primary side of the current sense transformer includes a current sense winding and an auxiliary winding, the current sense transformer including a secondary winding, the secondary winding having a first and second terminal, wherein the first terminal of the secondary winding is electrically coupled to a first correction unidirectional current flow means and wherein the second terminal of the secondary winding is electrically coupled to a second correction unidirectional current flow means.

3. The half-bridge voltage transformer circuit recited in claim 2 further including a first balance unidirectional current flow means, the first balance unidirectional current flow means electrically coupled to the second terminal of the auxiliary winding of the current sense transformer, a second balance unidirectional current flow means, the second balance unidirectional current flow means electrically coupled to the second terminal of the balance winding of the current sense transformer.

4. The half-bridge voltage transformer circuit recited in claim 3 wherein the auxiliary winding of the current sense transformer is the means for sensing the amount of current in the balance winding of the power transformer means.

5. The half-bridge voltage transformer circuit recited in claim 3 wherein the number of turns on the current sense winding of the current sense transformer is different than the number of turns on the auxiliary winding of the current sense transformer.

6. The half-bridge voltage transformer circuit recited in claim 2 wherein the secondary winding is a center tapped winding that includes a first feedback winding and a second feedback winding, wherein the center tap node between the first feedback winding and the second feedback winding is connected to ground, and further wherein the number of turns in the first feedback winding is equal to the number of turns in the second feedback winding.

7. The half-bridge voltage transformer circuit recited in claim 2 wherein a first terminal of the current sense winding of the current sensing transformer is electrically coupled to the center tap node and the first terminal of the balance winding of the power transformer means and the second terminal of the current sense winding of the current sensing means is electrically coupled to the second terminal of the power winding of the power transformer means.

8. The half-bridge voltage transformer circuit recited in claim 1 wherein a resistor is used as the means for sensing the amount of current in the balance winding.

9. The half-bridge voltage transformer circuit recited in claim 1 wherein a Hall effect device is used as the means for sensing the amount of current in the balance winding.

10. The half-bridge voltage transformer circuit recited in claim 8, wherein the means for injecting a correction current proportionate to the amount of current in the balance winding includes a resistor electrically coupled to an amplifying circuit means, wherein the output of the amplifying circuit means is input to a combining circuit.

11. The half-bridge voltage transformer circuit recited in claim 8, wherein the half-bridge voltage transformer provides a stable center tap node voltage for a first input voltage less than 50 volts.

* * * * *